UNITED STATES PATENT OFFICE.

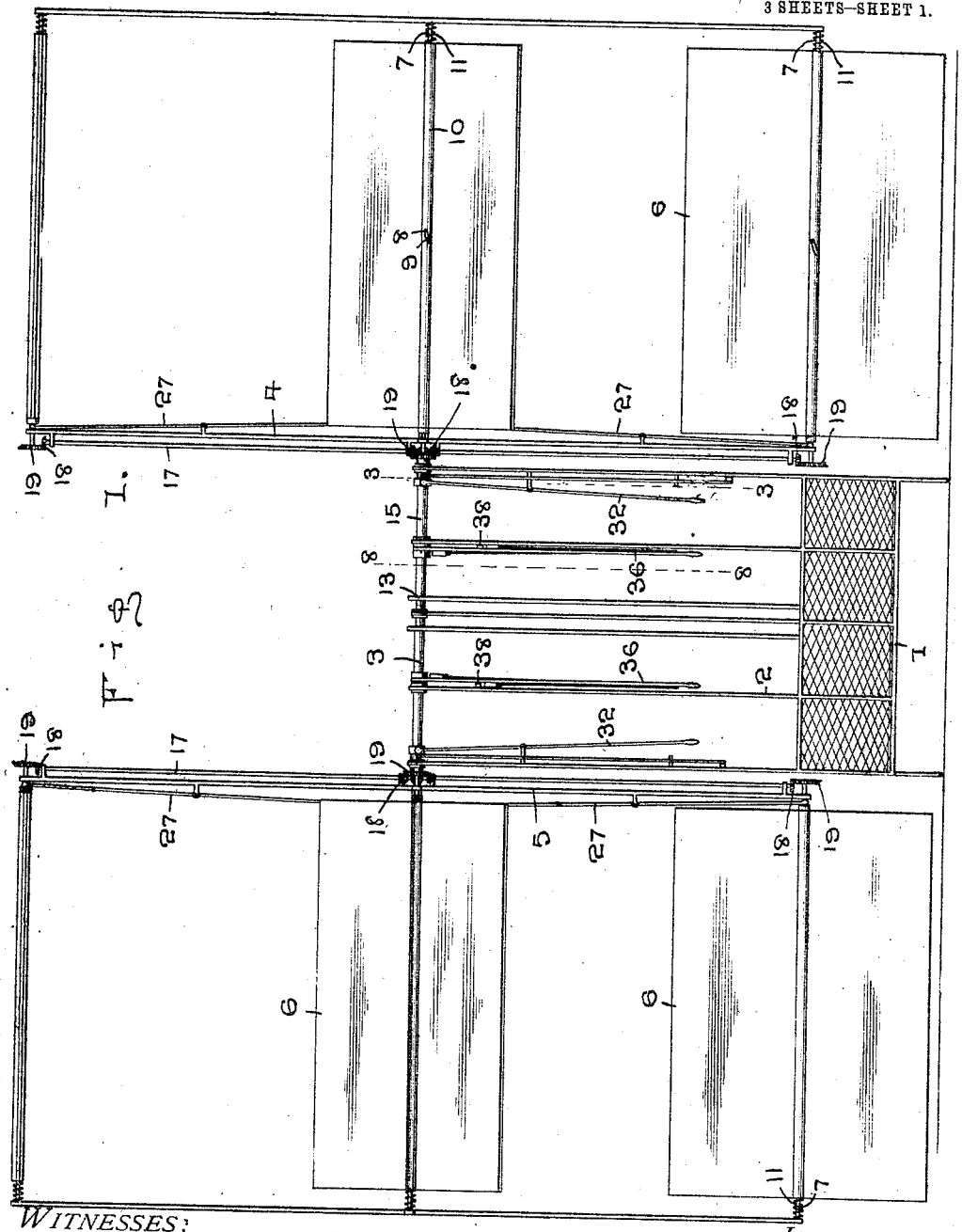

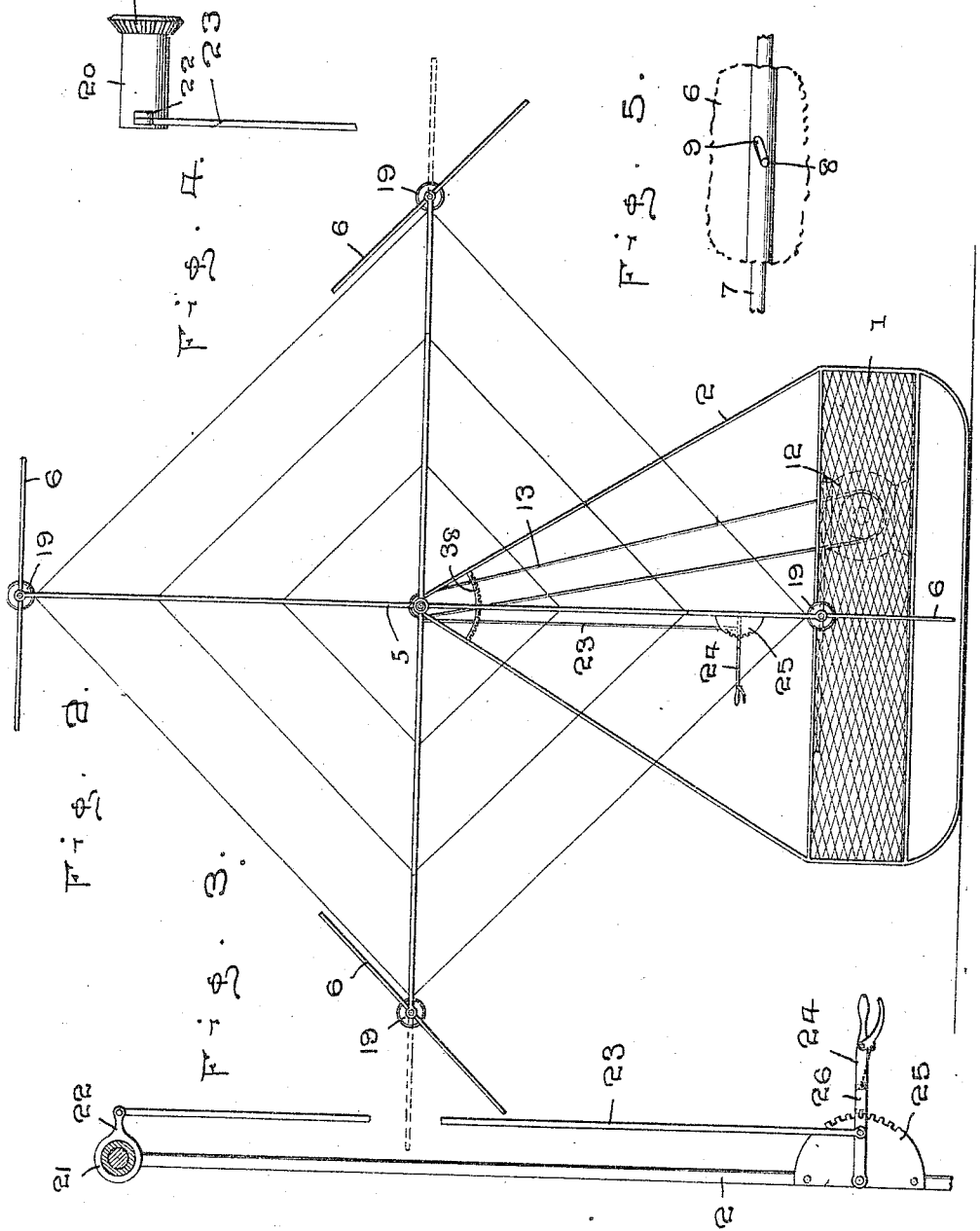

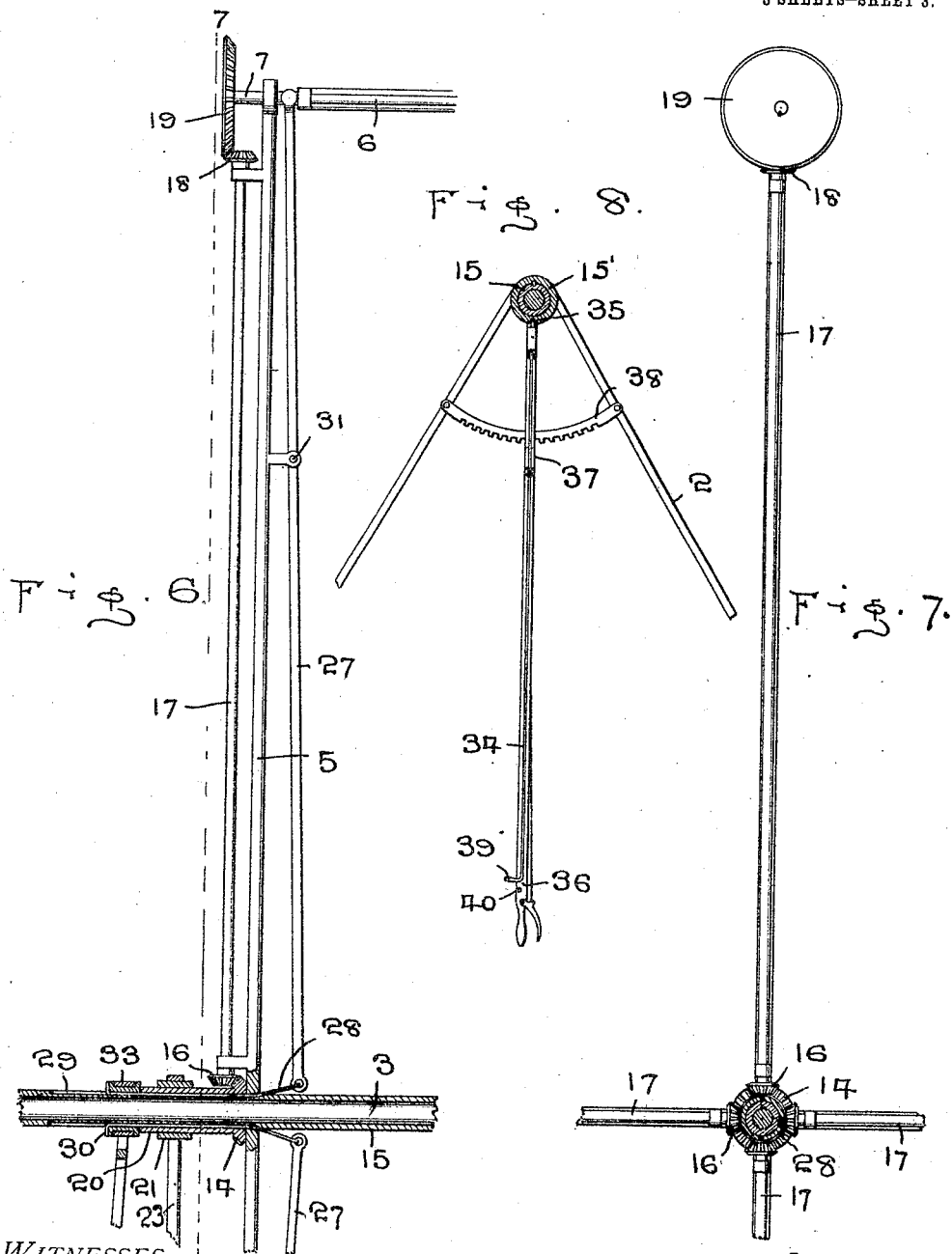

THOMAS H. E. FOLGER, OF CORRAL, IDAHO.

FLYING-MACHINE.

1,006,074.

Specification of Letters Patent.  Patented Oct. 17, 1911.

Application filed July 19, 1909. Serial No. 508,291.

*To all whom it may concern:*

Be it known that I, THOMAS H. E. FOLGER, a citizen of the United States, residing at Corral, in the county of Blaine and State of Idaho, have invented certain new and useful Improvements in Flying-Machines; and I do hereby declare the following to be a full, clear, and exact description of the invention, such as will enable others skilled in the art to which it appertains to make and use the same.

My invention relates to new and useful improvements in flying machines and my object is to provide means for propelling the machine.

A further object is to provide means for stopping the propelling parts of the machine at a predetermined position.

A further object is to provide means for operating the propeller blades to position the same in a horizontal position and cause the machine to sail through the air, and a further object is to provide means to change the relative positions of the blades when it is desired to elevate or lower the car.

Other objects and advantages will be hereinafter referred to and more particularly pointed out in the claims.

In the accompanying drawings forming part of this application, Figure 1 is a front elevation of the machine, showing the position of the parts when flying. Fig. 2 is a side elevation thereof. Fig. 3 is a detail elevation of a lever employed for controlling the movement or direction of the machine as seen on line 3—3, Fig. 1. Fig. 4 is a detail elevation of the cog and sleeve operated by said lever. Fig. 5 is a detail elevation of one of the propeller blades, showing a means for causing said blades to assume a horizontal position when the machine is sailing. Fig. 6 is a detail view partly in section of the driving mechanism. Fig. 7 is a view partly in section as seen on line 7—7, Fig. 6, and Fig. 8 is a view partly in section as seen on line 8—8, Fig. 1, showing the lever for setting the blades when the machine is sailing.

Referring to the drawings in which similar reference numerals designate corresponding parts throughout the several views, 1 indicates the basket or body of my improved flying machine, which may be constructed in the usual or any preferred manner and of any suitable dimensions, said basket being supported by rods or cables 2, which rods are attached at their upper ends to a shaft 3, said shaft being rotatable with respect to said supporting rods.

Attached to the shaft 3 at each side of the connections of the basket 1, are frames 4, which frames are constructed of crossed bars 5 and a pair of the frames are placed at each side of the basket, said frames being spaced apart to receive blades 6, which blades are of less length than the distance between the frames of each pair, whereby the blades may be moved lengthwise, said blades being mounted upon shafts 7 and are caused to rotate with respect to said shafts through the medium of a pin 8, carried by the shaft 7 entering a slot 9 in the socket portion 10 of the blade and the blades are normally retained adjacent the inner frame by means of a spring 11, which spring is disposed around the shaft 7 and between the outer end of the blade and the end of the bar in which the shaft 3 is mounted.

The shaft 3 and frames attached thereto are rotated through the medium of any suitable form of motor or motors 12, which motors are positioned within the basket 1 and are connected to the shaft 3 through the medium of driving chains 13, while the shafts 7 are rotated through the medium of a gear 14, which gear is non-rotatable and is mounted upon a sleeve 15, surrounding the shaft 3 and the gear 14 meshes with a pinion 16, which pinion is mounted upon a shaft 17 carried by the frame bar 5, the opposite end of said shaft also having a bevel pinion 18 which meshes with a driving gear 19 on the end of the shaft 7 and as the frame to which the shaft 17 is secured, rotates and the gear 14 remains stationary, said shaft 17 and the shaft 7 will be rotated through the medium of gears 18 and 19 attached thereto.

The gear 14 is provided with a tubular hub 20 to which is attached a band 21, said band having an arm 22 extending therefrom, to which is attached one end of a pitman 23, the opposite end of said pitman being in turn attached to a lever 24, one end of the lever being in turn pivotally attached to one of the supporting rods 2 and coöperating with the lever is a rack 25, with which the latch 26 on the lever is adapted to coact to hold the lever in its adjusted position.

The object of the lever and parts attached thereto is to provide convenient means for changing the relative positions of the blades with respect to the frames, whereby the machine will be caused to ascend or descend or to position said blades to cause the machine to travel forwardly as occasion may require and it will be readily seen that by swinging the lever on its pivot, the gear 14 will be partially rotated on the sleeve 15, which will result in changing the angles of the blades, which in turn will result in changing the course of the machine.

The blades as shown in Fig. 2 are positioned to drive the car forwardly as the frames and blades are rotated, but should it be desired to cause the machine to ascend, the lever 24 is swung upwardly from the position shown in Fig. 3 and downwardly to cause the machine to descend. The blades 6 are so arranged that when the car is being driven forwardly, the uppermost blade when immediately above the car, will rest in a horizontal position, while the other blades will be positioned at the proper angle and the upward swinging movement of the lever 24 will elevate the forward edge of the horizontal blade and correspondingly change the position of the remaining blades, which will result in elevating the machine and vice versa when the lever 24 is lowered from the position shown in Fig. 3.

When it is desired to cause the machine to sail through the air, the engine is stopped and all of the blades brought to a horizontal position as shown by dotted lines in Fig. 2, which is accomplished by moving three of the blades longitudinally on their respective shafts, it not being necessary to change the position of the uppermost blade as it always rests in a horizontal position when the frames are stopped and positioned as shown in Fig. 2. The blades are moved lengthwise of their shafts by means of levers 27, the outer ends of which are preferably bifurcated and straddle the shaft 7 and bear against the ends of the blades, while the inner ends thereof terminate in juxtaposition to the sleeve 15 and have attached thereto cables 28, said cables being positioned in grooves 29 in the outer face of the sleeve 15 and through the tubular hub on the gear 14, the ends of the cables so extended being fixed to a collar 30 also surrounding the sleeve 15 and it will be readily seen that when the collar is moved away from the end of the tubular hub, the inner ends of the levers will be swung inwardly and the outer ends outwardly in view of the pivotal connection 31 between the bar 5 and lever 27. As the levers are swung on their pivots, and the blades moved longitudinally on their shafts, they are brought to a horizontal position through the medium of the slots 9 and pins 8, said slots being disposed at such an angle as to bring each of the blades to a horizontal position when the pin has been moved the length of the slot and as the blades are in different positions, the angles of the slots are arranged accordingly.

The collar 30 is moved longitudinally of the sleeve 15 through the medium of a lever 32, which lever is pivotally attached to one of the supporting rods of the basket and has its upper end bifurcated and attached to a strap 33 surrounding the collar 30, said collar having a peripheral channel to receive the strap and it will be readily seen that by swinging the lever 32 on its pivot, the lever 27 will be swung on its pivot and the blades brought to a horizontal position.

The frames 4 and blades carried thereby are maintained in their fixed positions when arranged for sailing the machine, by providing a locking pin 34, the upper end of which is adapted to enter a notch 35 in parts of a sleeve 15' surrounding the sleeve 15, and keyed thereto, said locking pin being carried by a lever 36, which lever is pivotally or loosely mounted at its upper end on the sleeve 15 and has a latch 37 on its length engaging a rack 38 carried by the basket supporting rods 2, and by this means the guiding of the machine may be readily accomplished as the swinging of the lever will move the blades in such position as to cause the machine to ascend or descend. This lever is likewise employed for changing the position of the blades and frames with respect to the basket in order to cause the machine to ascend or descend when the machine is moving forward and at such times as the blades and frames to which they are secured, are rotated, the locking pin 31 is moved downwardly and the hooked end 39 engaged with a pin 40, thereby holding the locking pin out of engagement with its respective notch.

It will be noted that the blades are only all moved to horizontal positions after the frames have been locked, or simultaneously with the locking of said frames, when the machine is set for sailing. As there is only one notch 35 for the pin 34 to engage and as the lever 36 is supposed to be in a vertical position at the point of locking, it will be seen that one particular blade will always be stopped immediately above the shaft 3 and as said blade at that point is always at its horizontal position, it will only be necessary for the mechanism operating the blades to their horizontal positions to extend to three of the blades on each frame.

In operating the flying machine, the levers 24 are first set to position the blades with respect to the basket to cause the machine to ascend when power is applied to the shaft 3 and after the machine has reached the proper height, the levers 24 are positioned to bring the frames and blades to the plane as shown in Fig. 2, which will serve to drive the machine forwardly and maintain the same at a uniform height when traveling forwardly, but should it be desired to ascend, the lever 24 is swung upwardly and when it is desired to descend said lever is swung downwardly, which action will cause the blades to be swung in such positions as to allow the machine to ascend or descend.

If any of the parts of the machine become broken, the machine may be kept suspended in the air until it gradually settles to the ground by arranging the blades in a horizontal position, which is done by shifting the levers 32 and 27 and moving the blades outwardly, while at the same time the locking pins are engaged with the notches in the sleeves 15' and thereby retain the blades in their horizontal positions.

As shown in the drawing, there is a set of frames at each side of the basket, but it will be clearly understood that the device may be operated with a single pair of frames and blades therefor, in which instance the operating levers, etc., would be arranged accordingly and it will further be seen that the weight of the basket and its contents will serve as a ballast for the machine and maintain the same on an even keel and in view of the amount of area of the blades, a great lifting and driving power will be obtained without greatly adding to the expense of the machine and it will likewise be seen that by providing the controlling means as shown, said machine may be kept under perfect control and easily operated.

What I claim is:

1. In a flying machine, the combination with blades, frames therefor, and means to rotate said blades and frames, of means to hold said frames against rotation and additional means to position and maintain said blades in a horizontal plane.

2. In a flying machine, the combination with frames, a plurality of blades, means to rotate said frames and additional means to rotate said blades; of means to hold said frames against rotation and additional means to shift the position of the blades whereby the machine will be caused to ascend or descend.

3. In a flying machine, the combination with frames, a plurality of blades rotatably mounted in said frames, means to rotate the frames and additional means to rotate the blades; of means to move said blades longitudinally on their bearings, means to retain the frames against rotation and additional means to cause said blades to assume a horizontal position when moved lengthwise.

4. In a flying machine, the combination with a plurality of blades, supporting frames for said blades, and means to rotate said frames; of a gear mounted on a shaft between said frames, a tubular hub on said gear, levers carried by said frames adapted to move said blades longitudinally and operating means for said levers extending through said tubular hub.

5. In a flying machine, the combination with a plurality of blades and means to support said blades; of means to move said blades lengthwise of their bearings and transversely of the course of the machine, additional means to cause said blades to assume a horizontal position when moved lengthwise, and additional means to return said blades to their initial positions.

6. In a flying machine, the combination with a shaft, frames carried by said shaft and a plurality of blades rotatably mounted between said frames; of a gear surrounding said shaft, said gear having a tubular hub, intermeshing gears between said first mentioned gear and said blades adapted to rotate said blades when the frames are rotated, cables extending through said first mentioned gear and its tubular hub, means to move said cables longitudinally and additional means extending from the cables to said blades adapted to move said blades longitudinally when the cables are moved through said gear and hub.

7. In a flying machine, the combination with a shaft, frames on said shaft, a plurality of blades and supporting shafts for the blades carried by the frames; of a gear on said first mentioned shaft, a tubular hub on said gear, a driving gear on the blade shaft, a vertical shaft extending from the first mentioned to the last mentioned gear, a pinion at each end of said vertical shaft meshing with said gears and a lever connected to said tubular hub adapted to partially rotate said hub and control the position of said blades above or below the horizontal.

8. In a flying machine, the combination with a shaft, frames movably mounted on said shaft, blades carried by said frames, a sleeve on said shaft, means to rotate said frames and shaft and additional means to rotate said blades; of a lever, a locking pin on said lever adapted to engage said sleeve and hold said shaft and frame against rotation and additional means to hold said lever in its adjusted position whereby said blades will be held at a predetermined angle.

9. In a flying machine, the combination with rotatable frames, blades carried by said frames and rotatable with respect thereto; of means to control the positions of said blades when said frames are rotated, and additional means to control said blades when said frames are not propelled.

10. In a flying machine the combination with a basket, rotatable frames, blades carried by said frames and rotatable with respect thereto, and means to control the positions of said blades during rotation; of means to lock said frames against rotation, means to cause said blades to assume the horizontal position, and additional means to position said frames with respect to said basket when locked and correspondingly the blades.

11. In a flying machine the combination with rotatable frames, blades carried by said frames and rotatable with respect thereto and means to control the positions of said blades; of means to lock said frames against rotation and additional means to cause said blades to assume a horizontal position.

12. In a flying machine the combination with rotatable frames and blades rotatable within said frames; of means to lock said frames against rotation, means to move said blades lengthwise of their bearings, and additional means to cause said blades to assume a horizontal position when moved lengthwise.

In testimony whereof I have signed my name to this specification in the presence of two subscribing witnesses.

THOMAS H. E. FOLGER.

Witnesses:
  C. A. NEALE,
  C. S. FRYE.